(12) United States Patent
Bento

(10) Patent No.: US 7,114,521 B2
(45) Date of Patent: Oct. 3, 2006

(54) DOUBLE VALVE CONSTRUCTED FROM UNITARY SINGLE VALVES

(75) Inventor: José Carlos Bento, São Paulo (BR)

(73) Assignee: Ross Operating Valve Company, Troy, MI (US)

( * ) Notice: Subject to any disclaimer, the term of this patent is extended or adjusted under 35 U.S.C. 154(b) by 418 days.

(21) Appl. No.: 10/718,245

(22) Filed: Nov. 20, 2003

(65) Prior Publication Data

US 2005/0045234 A1    Mar. 3, 2005

(51) Int. Cl.
    *F15B 13/043* (2006.01)
    *F15B 20/00* (2006.01)

(52) U.S. Cl. .................... 137/596.16; 91/424

(58) Field of Classification Search ............ 137/557, 137/596.16, 596.18; 91/424, 448
See application file for complete search history.

(56) References Cited

U.S. PATENT DOCUMENTS

| | | | | |
|---|---|---|---|---|
| 2,906,246 | A | | 9/1959 | Di Tirro et al. |
| 3,051,187 | A | * | 8/1962 | Ludwig ................. 137/596.16 |
| 3,068,897 | A | * | 12/1962 | Ruchser ............... 137/596.16 |
| 3,244,193 | A | * | 4/1966 | Loveless ............... 137/596.18 |
| 3,265,089 | A | * | 8/1966 | Nill ..................... 137/596.16 |
| 3,316,930 | A | * | 5/1967 | Garduer ............... 137/596.16 |
| 3,699,993 | A | * | 10/1972 | Herion et al. ............ 91/424 |
| 3,848,848 | A | * | 11/1974 | Di Tirro ............... 137/596.16 |
| 4,100,937 | A | * | 7/1978 | Mallory ................ 137/596.16 |
| 4,181,148 | A | * | 1/1980 | Russell et al. ......... 137/596.16 |
| 4,257,455 | A | | 3/1981 | Cameron |
| 4,269,225 | A | * | 5/1981 | Ruchser et al. ........ 137/596.16 |
| 4,291,613 | A | * | 9/1981 | Porter .................. 137/596.16 |
| 4,345,620 | A | * | 8/1982 | Ruchser et al. ........ 137/596.16 |
| 4,359,064 | A | * | 11/1982 | Kimble ................ 137/596.16 |
| 4,542,767 | A | * | 9/1985 | Thornton et al. ....... 137/596.16 |
| 4,706,548 | A | * | 11/1987 | Baldauf et al. .............. 91/424 |
| 5,927,324 | A | | 7/1999 | Russell et al. |
| 5,975,134 | A | * | 11/1999 | Schwelm ............. 137/596.16 |
| 6,604,547 | B1 | | 8/2003 | Bento |
| 2002/0129856 | A1* | | 9/2002 | Reinelt et al. ......... 137/596.16 |

FOREIGN PATENT DOCUMENTS

BR        9702779        3/1999

\* cited by examiner

*Primary Examiner*—John Rivell
(74) *Attorney, Agent, or Firm*—MacMillan, Sobanski, & Todd; Mark Mollon

(57) ABSTRACT

A double valve is constructed from first and second unitary valve assemblies each having a respective inlet port, a respective outlet port, a respective exhaust port, a respective first cross-mirror port, and a respective second cross-mirror port. A first plate is coupled to the first and second unitary valve assemblies and includes respective passages to provide a common inlet port coupled to the respective inlet ports of the first and second unitary valve assemblies and a common outlet port coupled to the respective outlet ports of the first and second unitary valve assemblies. A second plate coupled to the first and second unitary valve assemblies includes respective passages to provide a first cross-connection between the first cross-mirror port of the first unitary valve body and the second cross-mirror port of the second unitary valve body, a second cross-connection between the second cross-mirror port of the first unitary valve body and the first cross-mirror port of the second unitary valve body, and a common exhaust port coupled to the respective exhaust ports of the first and second unitary valve assemblies.

9 Claims, 13 Drawing Sheets

DOUBLE VALVE CONSTRUCTED FROM UNITARY SINGLE VALVES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to control valves, and, more specifically, to a double valve constructed from a pair a single-valve assemblies.

Pneumatically-powered machine tools of various types operate through a valving system which interacts with a pneumatically-controlled clutch and/or brake assembly. For safety reasons, the control valves that are used to operate these machine tools require the operator to activate two separate control switches substantially simultaneously to ensure that an operator's hands are away from the moving components of the machine tool when an operating cycle is initiated. Typically, an electronic circuit responsive to the two control switches generates a pilot control signal applied to the pilot valves for switching the main fluid circuit of the valve to control delivery of compressed air (or other fluid) to the machine tool to perform its operating cycle.

Double valves operating in parallel in one valve body have been developed to ensure that a repeat or overrun of a machine tool operating cycle cannot be caused by malfunction of a single valve unit (e.g., a valve becoming stuck in an actuated position). Thus, if one valve unit fails to deactuate at the proper time, the double valve assumes a configuration that diverts the source of compressed air from the machine tool. A double valve is shown, for example, in commonly assigned U.S. Pat. No. 6,478,049 to Bento et al, which is incorporated herein by reference for all purposes.

In a typical double valve, two movable valve units are mounted within respective bores within a single valve body or block. Each movable valve unit has a respective exhaust poppet between the outlet port and the exhaust port of the double valve and a respective inlet poppet between the outlet port and the inlet port of the double valve. Pilot valves are moved to an actuated position in response to an electrical control signal from a respective operator-controlled switch, which typically causes the exhaust poppets to close and the inlet poppets to open. Any time that 1) a valve unit fails to deactuate properly, 2) a valve unit fails to actuate properly, or 3) the pilot valves are actuated or deactuated non-simultaneously, then at least one valve unit becomes locked in a faulted position where its exhaust poppet cannot be closed (thereby preventing the outlet from becoming pressurized).

In addition to providing protection against the repeat or overrun of the machine tool, it is desirable to monitor the double valve for a faulted valve unit and to prevent a new operating cycle of the machine tool from being initiated. Thus, prior art systems have caused the double valve to assume a lock-out configuration when a single valve unit is in a faulted condition so that the double valve cannot again be actuated until it has been intentionally reset to clear the faulted condition.

The structure of an integrated double valve is relatively more complicated than that of a single poppet type valve. Consequently, the material costs and manufacturing costs of a double valve are higher. It would be desirable to achieve the safety functionality of a double valve (e.g., a locked out fault position and a monitoring capability) while avoiding the corresponding higher costs.

SUMMARY OF THE INVENTION

The present invention has the advantage of constructing a double valve at low cost without a complex manufacturing operation. A pair of single unitary valve assemblies are built into a double valve assembly in such a way that the safety functionality of a double valve is obtained.

In one aspect of the invention, a double valve comprises first and second unitary valve assemblies each having a respective inlet port, a respective outlet port, a respective exhaust port, a respective first cross-mirror port, and a respective second cross-mirror port. First and second pilot assemblies are coupled to the first and second unitary valve assemblies, respectively. A first plate is coupled to the first and second unitary valve assemblies and includes respective passages to provide a common inlet port coupled to the respective inlet ports of the first and second unitary valve assemblies and a common outlet port coupled to the respective outlet ports of the first and second unitary valve assemblies. A second plate coupled to the first and second unitary valve assemblies includes respective passages to provide a first cross-connection between the first cross-mirror port of the first unitary valve body and the second cross-mirror port of the second unitary valve body, a second cross-connection between the second cross-mirror port of the first unitary valve body and the first cross-mirror port of the second unitary valve body, and a common exhaust port coupled to the respective exhaust ports of the first and second unitary valve assemblies.

DETAILED DESCRIPTION OF PREFERRED EMBODIMENTS

Figure 1:
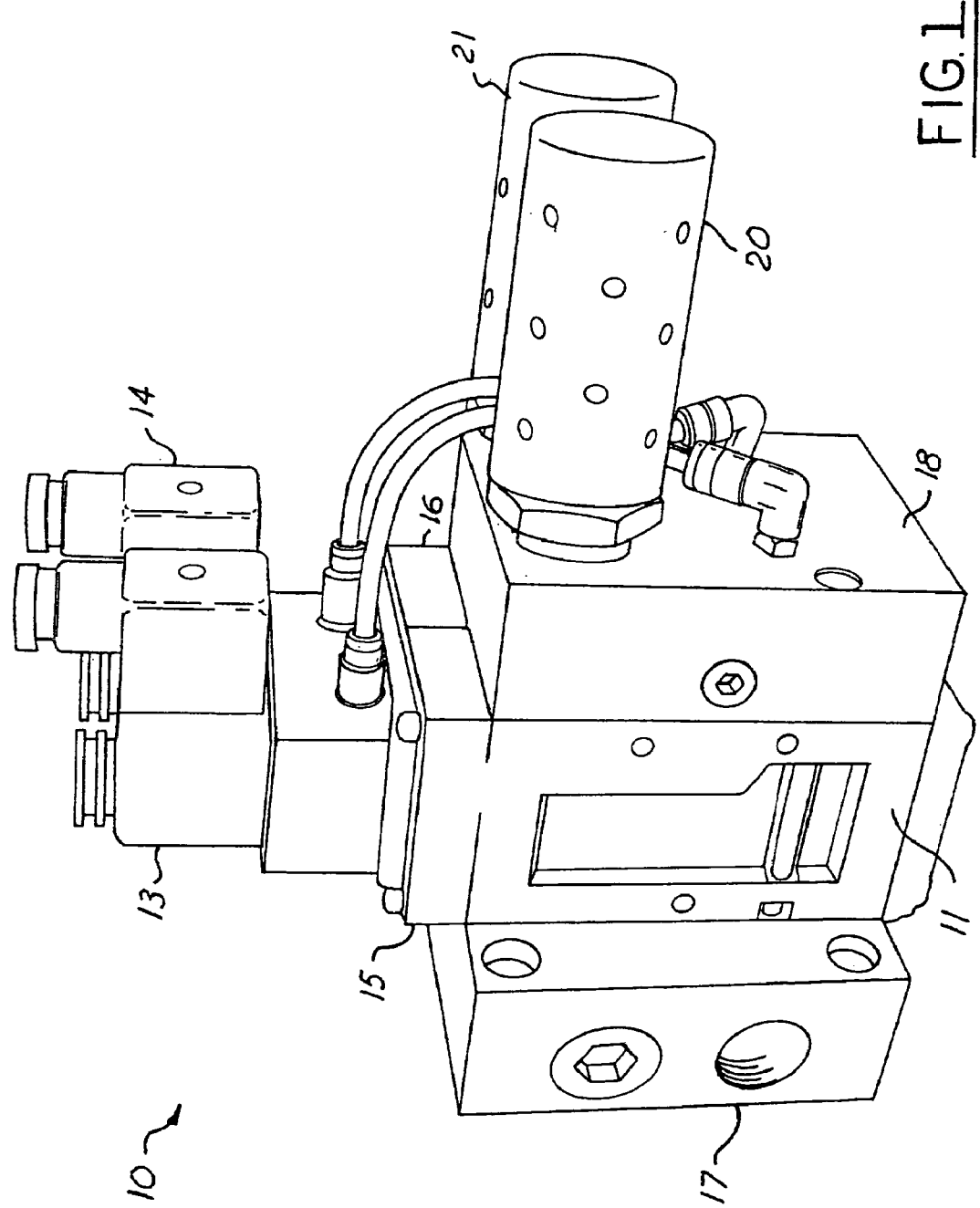
FIG. 1 is a perspective view of a double valve according to one embodiment of the invention.
Figure 2:
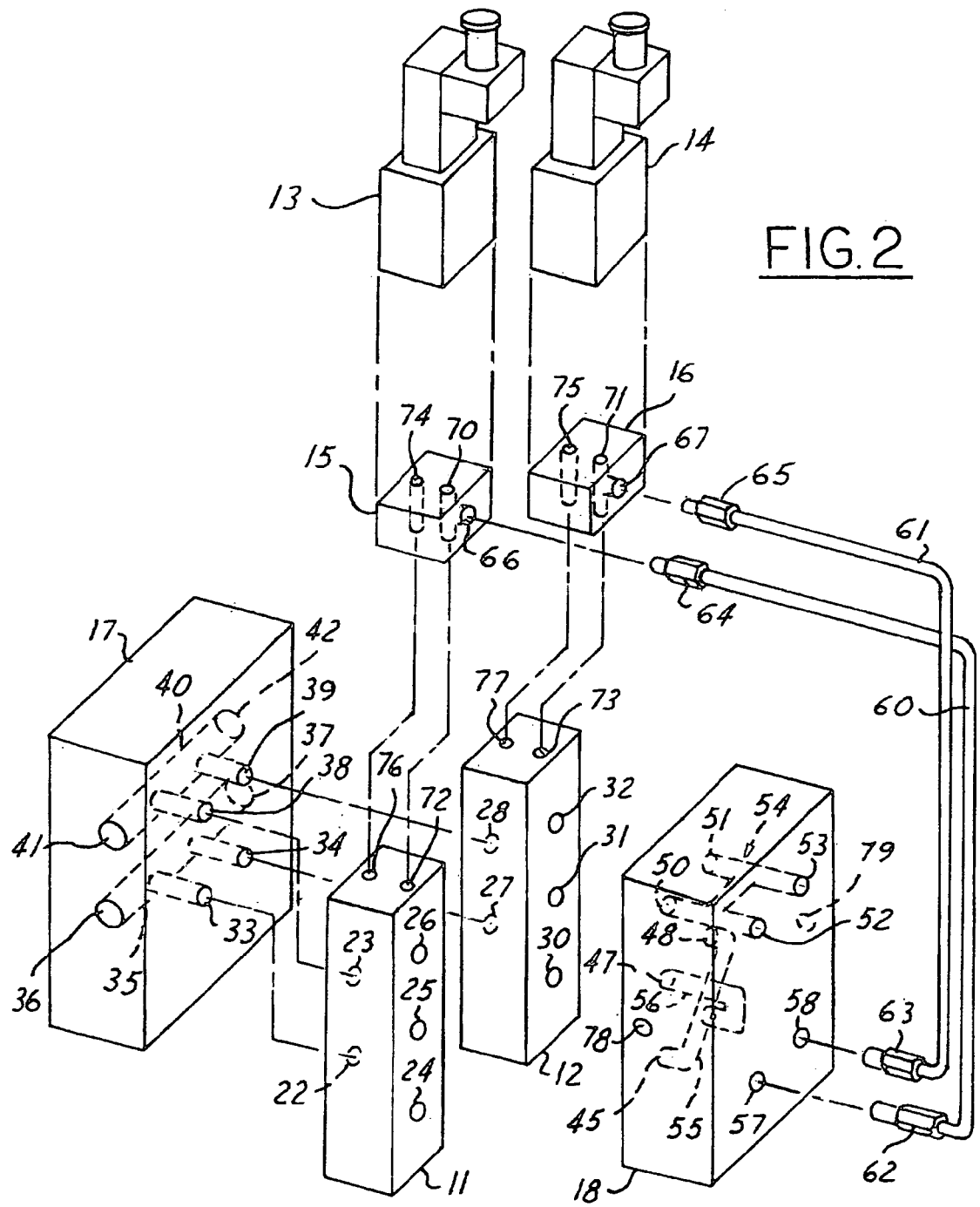
FIG. 2 is an exploded, perspective view of the double valve of FIG. 1.

Referring to FIGS. 1 and 2, a double valve 10 is shown comprising a first unitary valve assembly 11 and a second unitary valve assembly 12. The unitary valve assemblies are preferably comprised of standard single valves such as valve assemblies having part numbers SF6103-IP available from Yonwoo Pneumatic Company. A pair of solenoid valves 13 and 14 are coupled to valve assemblies 11 and 12 by adapter blocks 15 and 16, respectively. A first plate 17 is coupled to both first and second unitary valve assemblies at one side and a second plate 18 is coupled to first and second unitary valve assemblies 11 and 12 at the opposite side thereof. A pair of exhaust silencers 20 and 21 are coupled to exhaust ports on second plate 18 in order to muffle noise at the exhaust ports. First unitary valve assembly 11 includes an inlet port 22, an outlet port 23, a first cross-mirror port 24, a second cross-mirror port 25, and an exhaust port 26. Second unitary valve assembly 12 includes an inlet port 27, an outlet port 28, a first cross-mirror port 30, a second cross-mirror port 31, and an exhaust port 32.

First and second unitary valve assemblies 11 and 12 preferably comprise 5/2 way valves as is known in the art. After incorporation into the double valve of the present invention, a 3/2-way valve results.

Inlet ports 22 and 27 are joined by an inlet circuit contained in first plate 17 comprising ports 33 and 34 coupled to ports 22 and 27, respectively, a passage 35, and external inlet ports 36 and 37 at opposite ends of first plate 17. Likewise, an outlet circuit in first plate 17 interconnects outlet ports 23 and 28 of first and second unitary valve assemblies 11 and 12. Specifically, ports 38 and 39 are coupled to ports 23 and 28 and to a passage 40 extending through first plate 17 between external outlet ports 41 and 42. By providing two inlet ports and two outlet ports on first plate 17, one port can-be used as a working port while the second can be used as a sensing port. For example, a pressure switch or a pressure transducer can be used to monitor the outlet pressure at the sensing outlet port.

Second plate 18 includes various internal passages for coupling with first and second unitary valve assemblies 11 and 12. A first cross-connection includes ports 45 and 48 interconnected by a passage 55 for cross connecting first cross-mirror port 24 of first unitary valve assembly 11 with second cross-mirror port 31 of second unitary valve assembly 12. A second cross connection includes ports 46 and 47 interconnected by a passage 56 so that second cross-mirror port 25 of first unitary valve assembly 11 is connected with first cross-mirror port 30 of second unitary valve assembly 12. Second plate 18 further includes an exhaust circuit for interconnecting exhaust ports 26 and 32 of first and second unitary valve assemblies 11 and 12. Thus, ports 50 and 51 are interconnected with ports 52 and 53 by internal passages 54. Ports 50 and 51 are coupled to exhaust ports 26 and 32 of first and second unitary valve assemblies 11 and 12. Exhaust ports 52 and 53 on the exterior side of second plate 18 are preferably coupled to silencers 20 and 21 as shown in FIG. 1.

Second plate 18 includes pilot ports 57 and 58, which are coupled to cross-connection passages 55 and 56 by other internal passages (not shown). The pilot connections further include a pair of tubes 60 and 61 for supplying pilot pressure to solenoid pilot valves 13 and 14. A pair of elbow connections 62 and 63 couple tubings 60 and 61 to ports 57 and 58, respectively. Fittings 64 and 65 are coupled to connections 66 and 67 in adapter blocks 15 and 16, respectively. Connections 66 and 67 are coupled to passages 70 and 71 for supplying a source of pilot pressure to standard inlets in solenoid pilot valves 13 and 14. These passages may also correspond with pilot supply ports 72 and 73 on first and second unitary valve assemblies 11 and 12. A pair of passages 74 and 75 in adapter blocks 15 and 16, respectively, couple the output of solenoid valves 13 and 14 to pilot passages 76 and 77 of first and second unitary valve assemblies 11 and 12 in order to actuate the respective valves when the corresponding solenoid pilot valves are actuated by one or more electrical switches (not shown) and are being supplied with a source of pressurized fluid. In an alternative embodiment, pilot connections for supplying pilot pressure to the pilot valves can be comprised of internal passages within the bodies of valve assemblies 11 and 12 and/or within plate 18, instead of using external tubings.

Second plate 18 further includes sensing ports 78 and 79 which are interconnected with cross passages 55 and 56, respectively, by other internal passages (not shown) for providing sensing ports as described below.

Basic operation of the double valve of the present invention will now be described with reference to FIGS. 3–5. Valve assemblies 11 and 12 include spools 80 and 81 received in longitudinal bores 82 and 83 of valve bodies 84 and 85, respectively. The valve assemblies are comprised of 5 port, 2 position valves (5/2-way valves) having inlet ports 86 and 87, outlet ports 88 and 89, exhaust ports 90 and 91, first cross-mirror ports 92 and 93, and second cross-mirror ports 94 and 95, respectively. The ports of the first and second unitary valve assemblies are interconnected by passages 40 and 54–57 as shown. The first and second plates for implementing these passages are not explicitly shown in order to simply the drawings. Inlet passage 57, outlet passage 40, and exhaust passage 54 include external ports as shown so that the equivalent of a 3/2-way valve is achieved by the interconnection of the two 5/2-way valves.

Pressurized fluid at first cross-mirror ports 92 and 93 is provided to respective inlets of pilot valves 13 and 14 via passages 96 and 97 through flow restricters 98 and 99. Return springs 100 and 101 urge spools 80 and 81 into their upward deactuated positions as shown in FIG. 3. The areas within bores 82 and 83 beneath spools 80 and 81 are coupled to atmosphere via passages 102 and 103, respectively.

Figure 3:
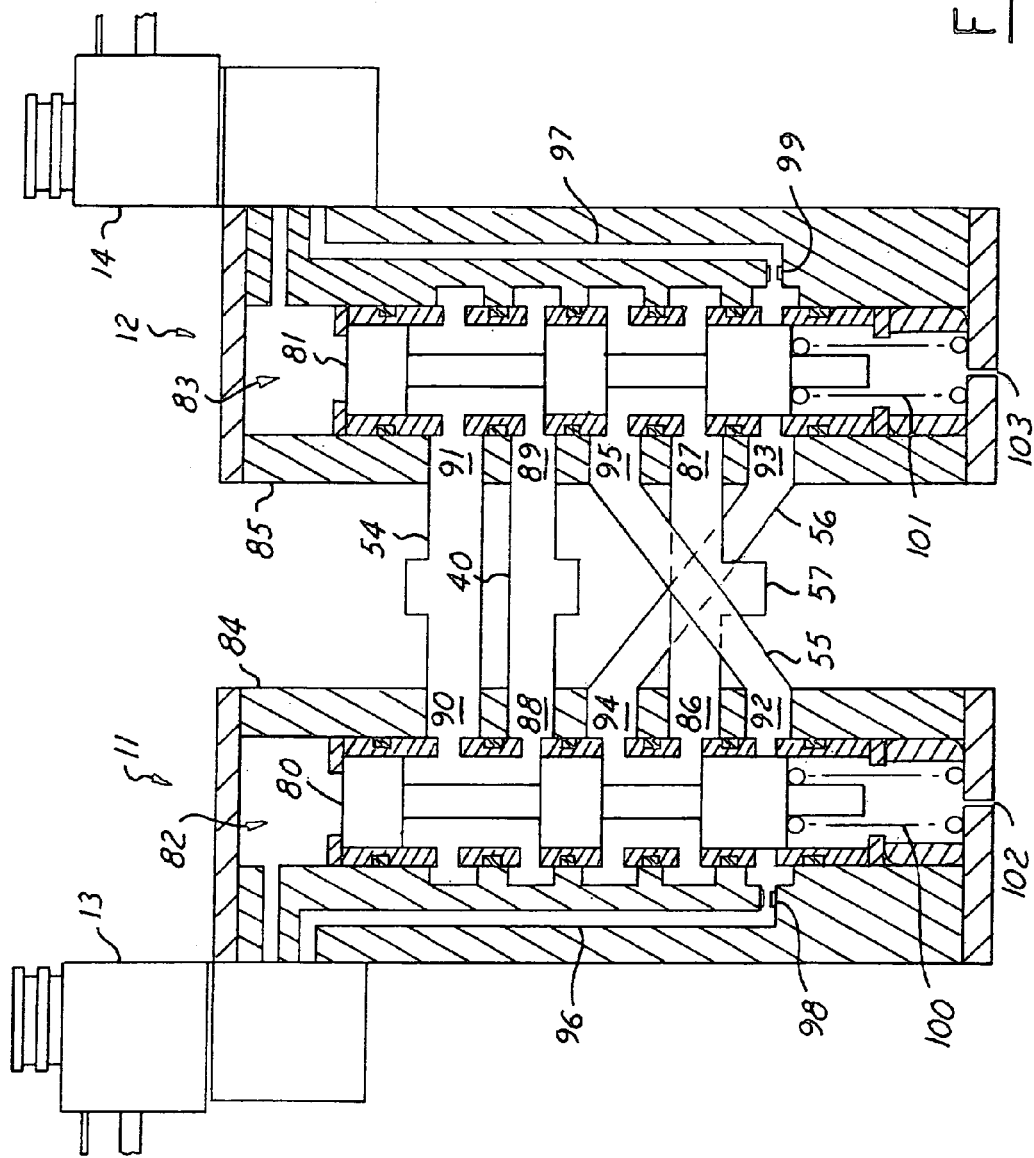
FIG. 3 is a side cross-sectional view of the unitary valve assemblies in an initial, deactuated position.
Figure 4:
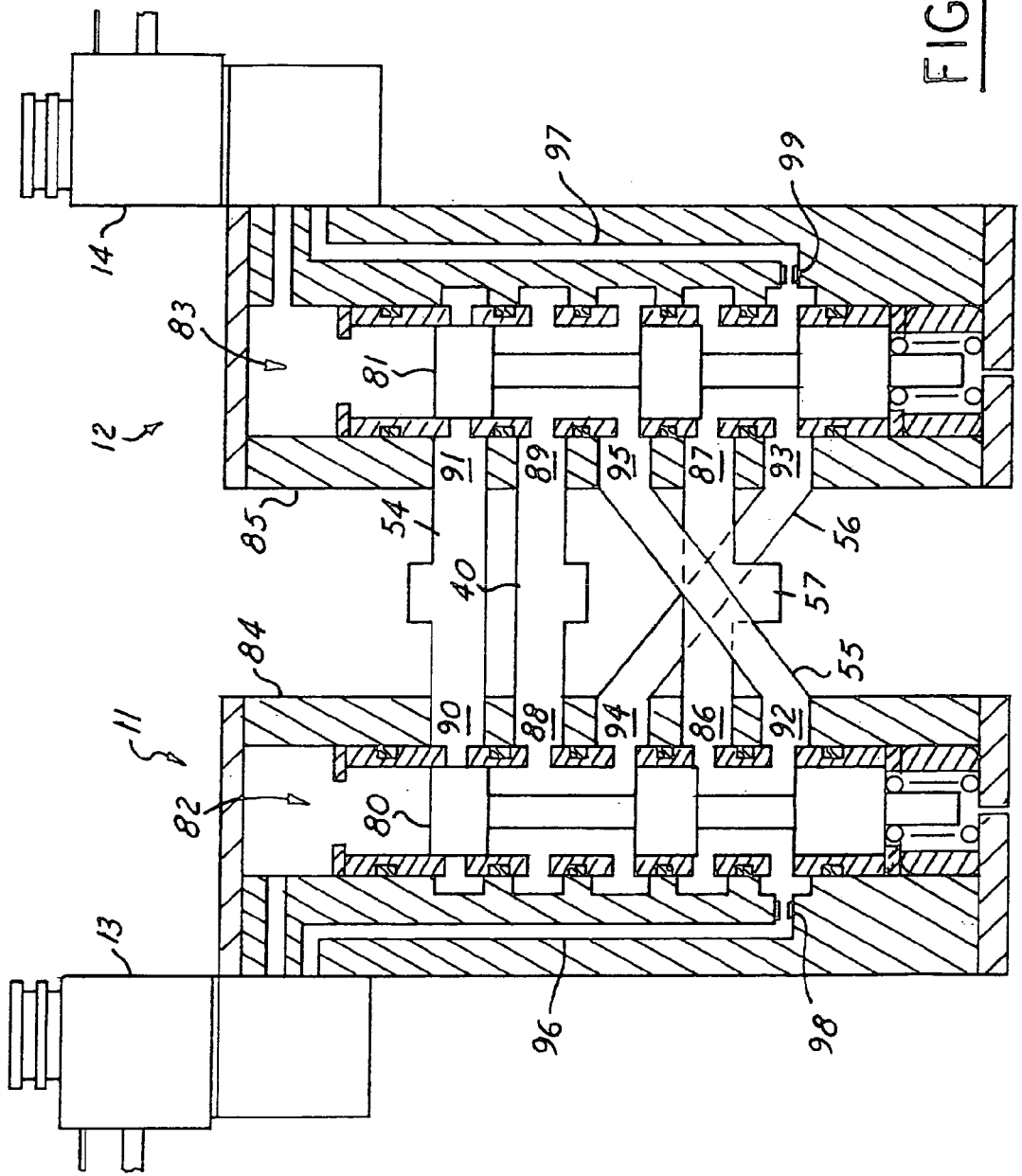
FIG. 4 is a side cross-sectional view of the unitary valve assemblies in an actuated position.

In the deactuated position shown in FIG. 3, outlet passage 40 is coupled to exhaust passage 54 through both valve assemblies 11 and 12. Inlet 57 is coupled to second cross-mirror ports 94 and 95 through both valve assemblies 11 and 12 and the cross connection of the cross-mirror ports provides the inlet pressure to first cross-mirror ports 92 and 93. Consequently, passages 96 and 97 are pressurized so that actuation of pilot valves 13 and 14 can move spools 80 and 81 to their actuated positions as shown in FIG. 4. Due to the position of spools 80 and 81 in the actuated position, inlet pressure at ports 86 and 87 flows to first cross-mirror ports 92 and 93, through the cross-connection to second cross-mirror ports 94 and 95 and through bores 82 and 83 to outlet ports 88 and 89.

Figure 5:
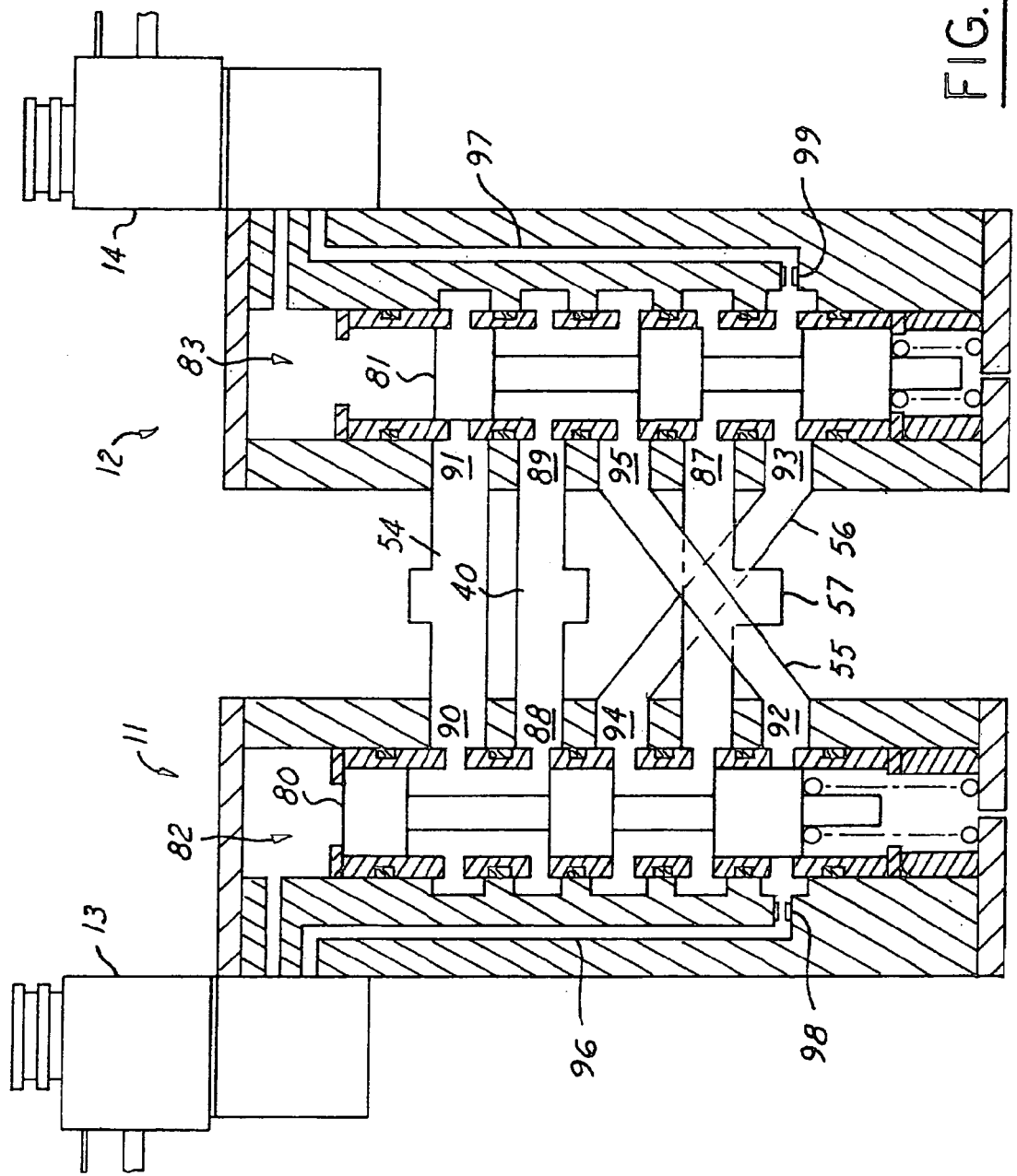
FIG. 5 is a side cross-sectional view of the unitary valve assemblies in a faulted position.
Figure 6:
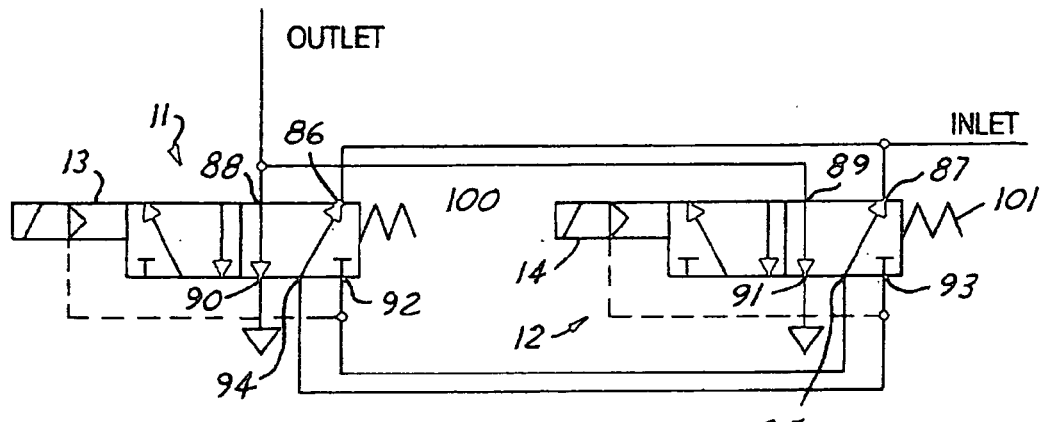
FIGS. 6–8 are pneumatic circuit diagrams showing the unitary valve assemblies in a deactuated position, an actuated position, and a faulted position, respectively.
Figure 7:
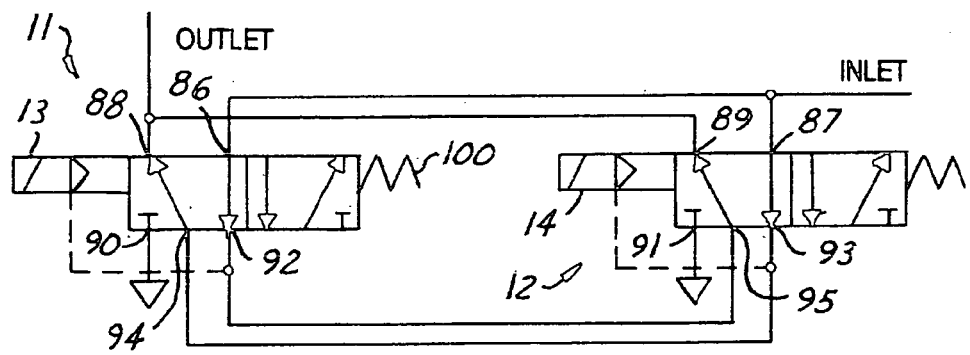
Figure 8:
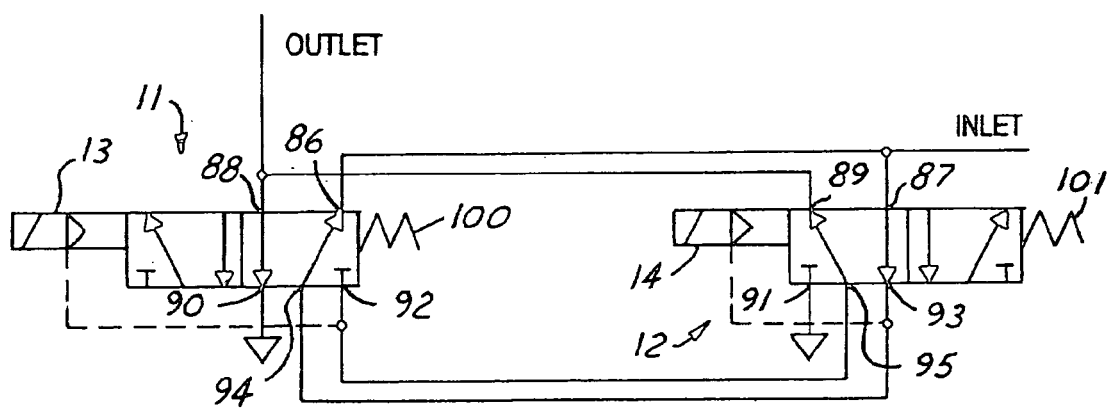

FIG. 5 shows double valve 10 in a faulted position wherein one valve assembly is in its deactuated position and the other valve assembly is in its actuated position. In the faulted position or state, outlet ports 88 and 89 are coupled to exhaust ports 90 and 91 so that the outlet cannot become pressurized. When in the faulted state, the valve assembly which is in its deactuated position (i.e., valve assembly 11 in FIG. 5) couples outlet passage 40 to exhaust passage 54. Also at that time, the valve assembly in its actuated position couples outlet passage 40 to the cross connection passage 55, thereby depressurizing the first cross-mirror port of the valve assembly in its deactuated position. Consequently, no pressure is provided to the pilot valve of the deactuated valve assembly and the deactuated valve assembly cannot become actuated. Therefore, a pneumatic press or other equipment being operated by the double valve cannot be actuated until the fault in the double valve is corrected. Therefore, the safety function of a double valve is achieved using a low cost solution having unitary valve assemblies integrated into a single structure.

FIGS. 6–9 show schematic representations of the pneumatic circuits of the double valve of the present invention in a deactuated position, an actuated position, and a faulted position of the double valve, respectively.

Figure 9:
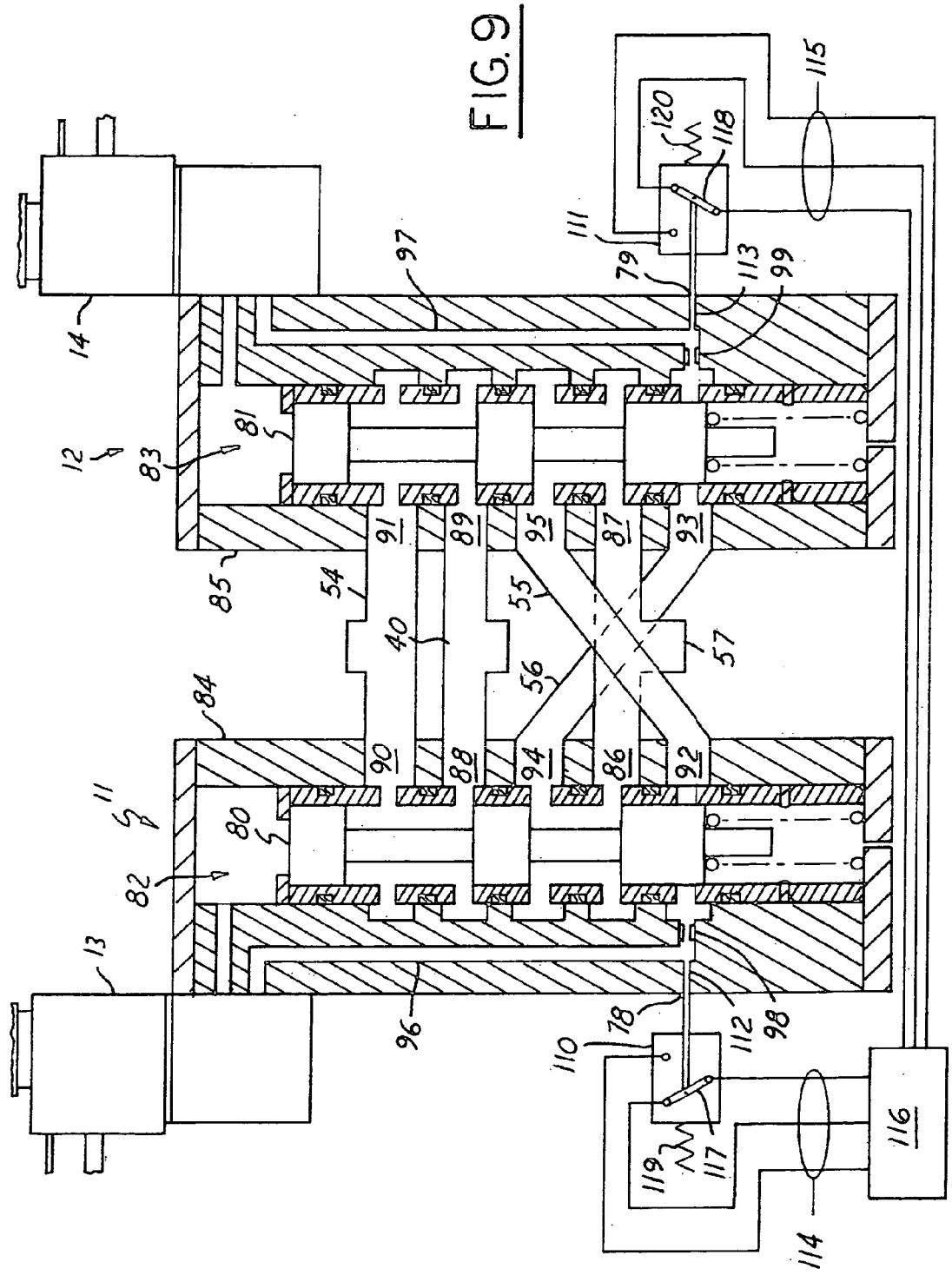
FIG. 9 is a side cross-sectional view of the double valve of the present invention in a deactuated position and incorporating pressure switches to be used as a failure indicator.
Figure 10:
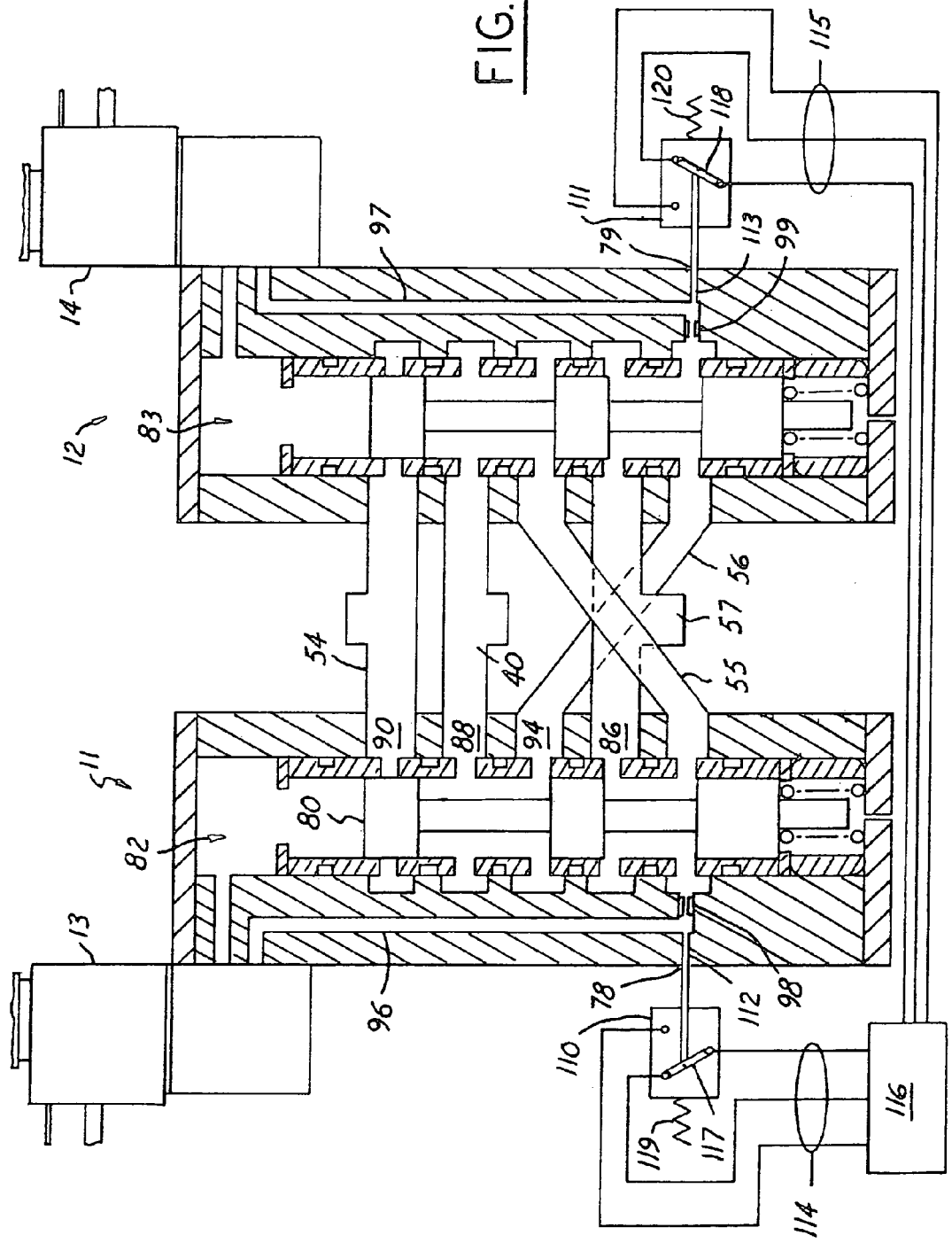
FIG. 10 is a side cross-sectional view of the double valve in FIG. 9 in an actuated position.
Figure 11:
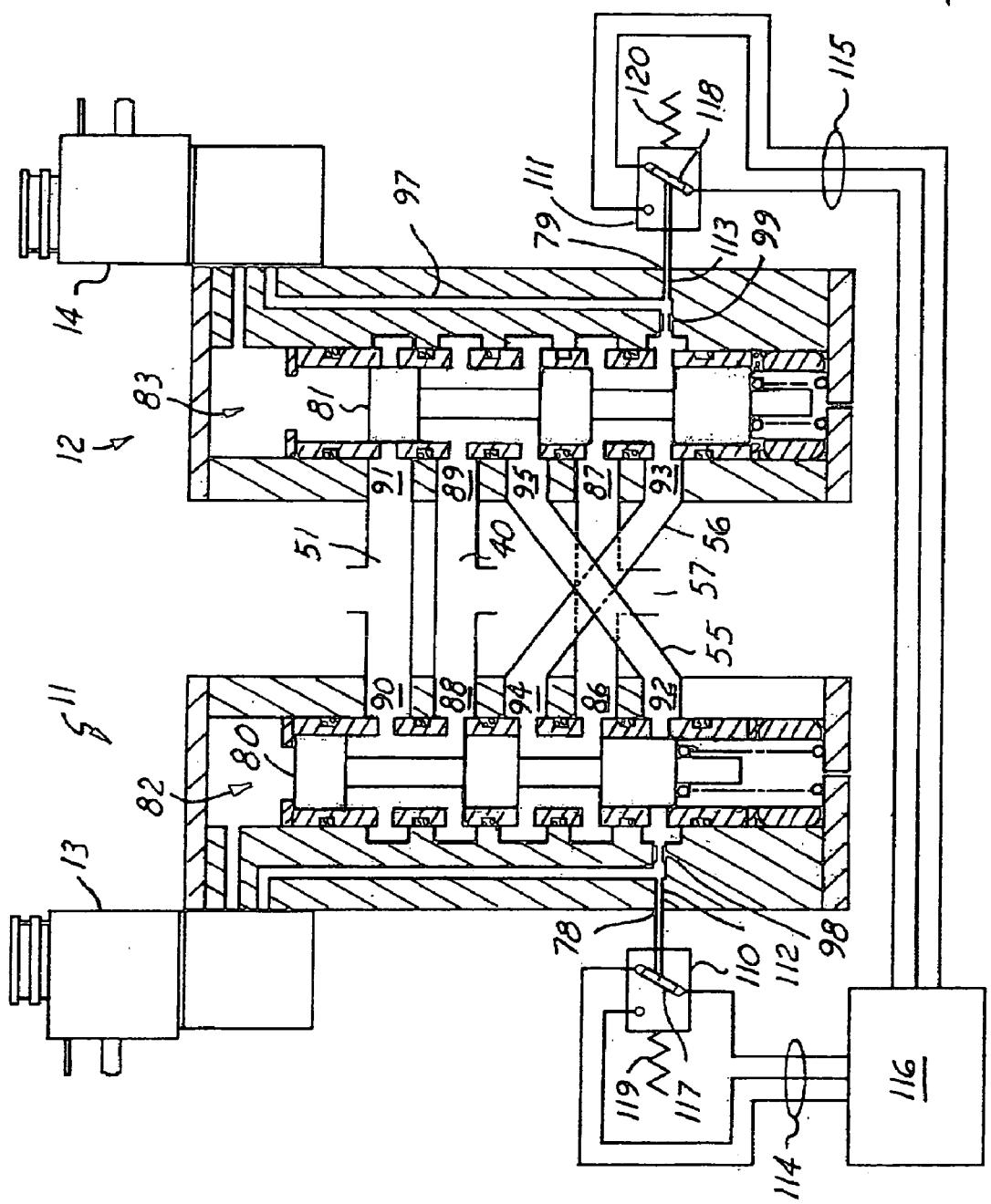
FIG. 11 is a side cross-sectional view of the double valve of FIG. 9 in a faulted position.

The present invention also provides for monitoring of the faulted/non-faulted state of the valve. A first embodiment is shown in FIGS. 9–11 including a pair of pressure switches 110 and 111 coupled to sensing ports 78 and 79 which lead to passages 112 and 113 and to first cross-mirror ports 92 and 93 through flow restricters 98 and 99, respectively. Pressure switches 110 and 111 are coupled via signal lines 114 and 115 to a control monitor circuit 116. An interconnection between the signal lines is controlled by a switch element 117 and 118, which may be actuated by pressurized fluid against springs 119 and 120 in pressure switches 110 and 111, respectively. In the embodiment shown in FIG. 9, pressure switches 110 and 111 are configured as failure indicators to monitor proper valve operation. As long as the unitary valve assemblies do not assume a faulted state (i.e., one valve assembly in an actuated position and the other valve assembly in a deactuated position), pressure is applied to pressure switches 110 and 111 via passages 112 and 113 from first cross-mirror ports 92 and 93. The cross-connection/pilot pressure applied to switches 110 and 111 actuates the switch elements 117 and 118, respectively, against springs 119 and 120 to provide an electrical signal to control monitor circuit 116, signifying proper operation of the double valve. FIG. 10 illustrates how pressure is supplied to both pressure switches 110 and 111 with the double valve in its actuated position.

When the double valve is in a faulted position as shown in FIG. 11, pressure to one of the pilot passages from the corresponding cross-mirror port drops to atmospheric pressure. Consequently, the corresponding switch (i.e., pressure switch 110 in FIG. 11) is no longer actuated against its spring and the switch element completes a circuit with the opposite contact thereby signifying that the double valve is in a faulted state.

Figure 12:
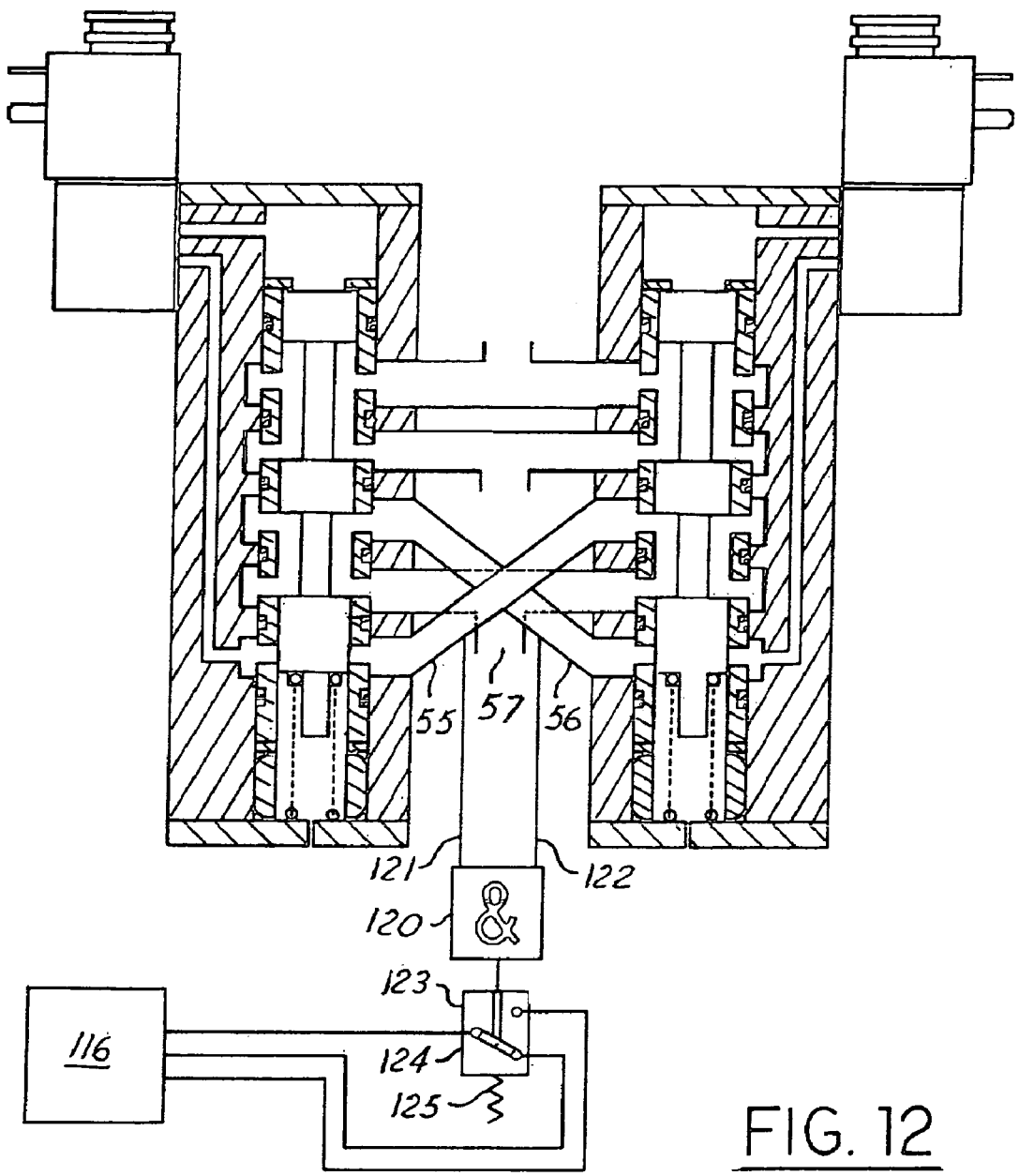
FIG. 12 is a side cross-sectional view of an alternative embodiment of a double valve including a pressure switch used as a failure indicator.
Figure 13:
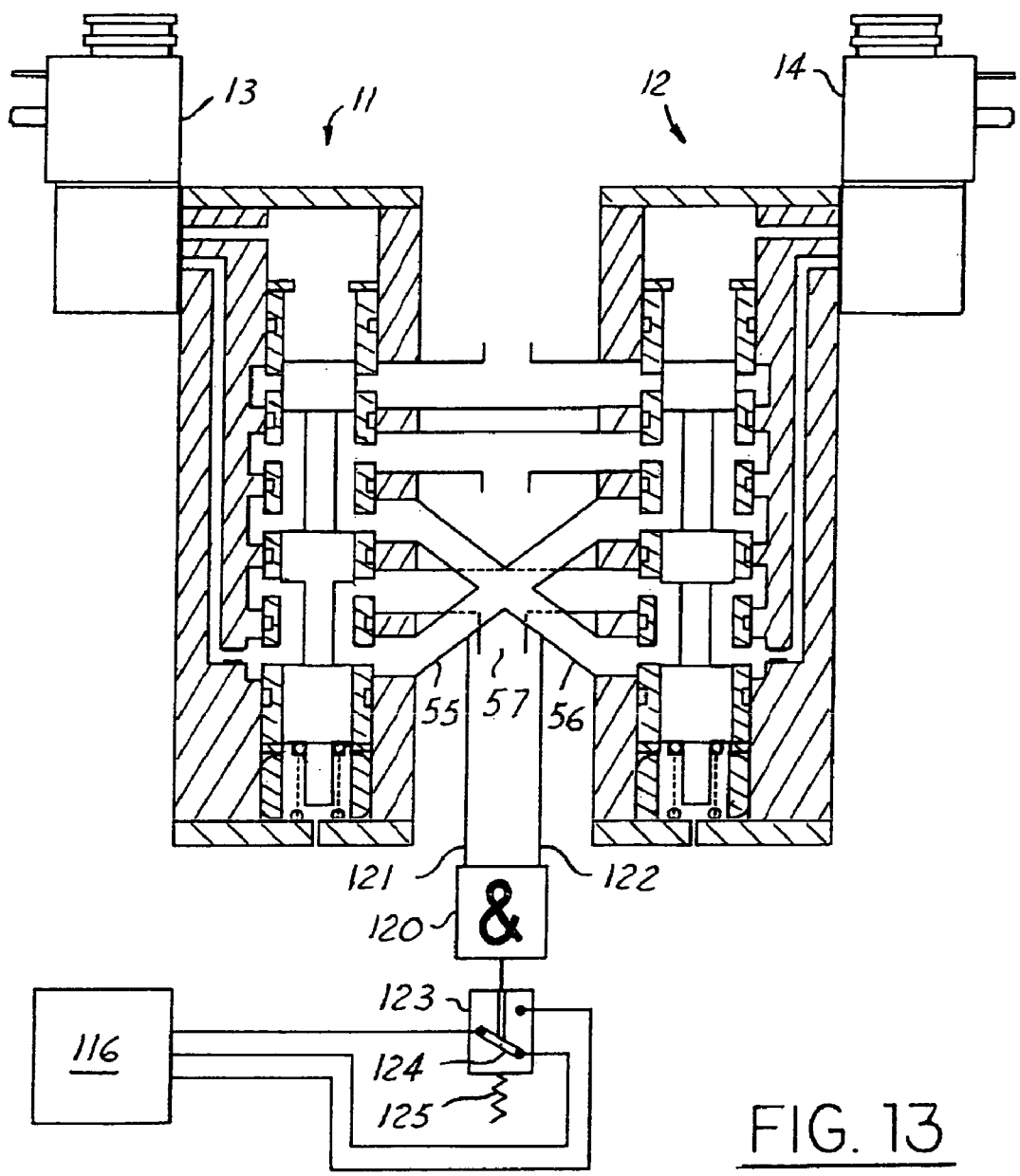
FIG. 13 is a side cross-sectional view of the double valve of FIG. 12 in an actuated position.
Figure 14:
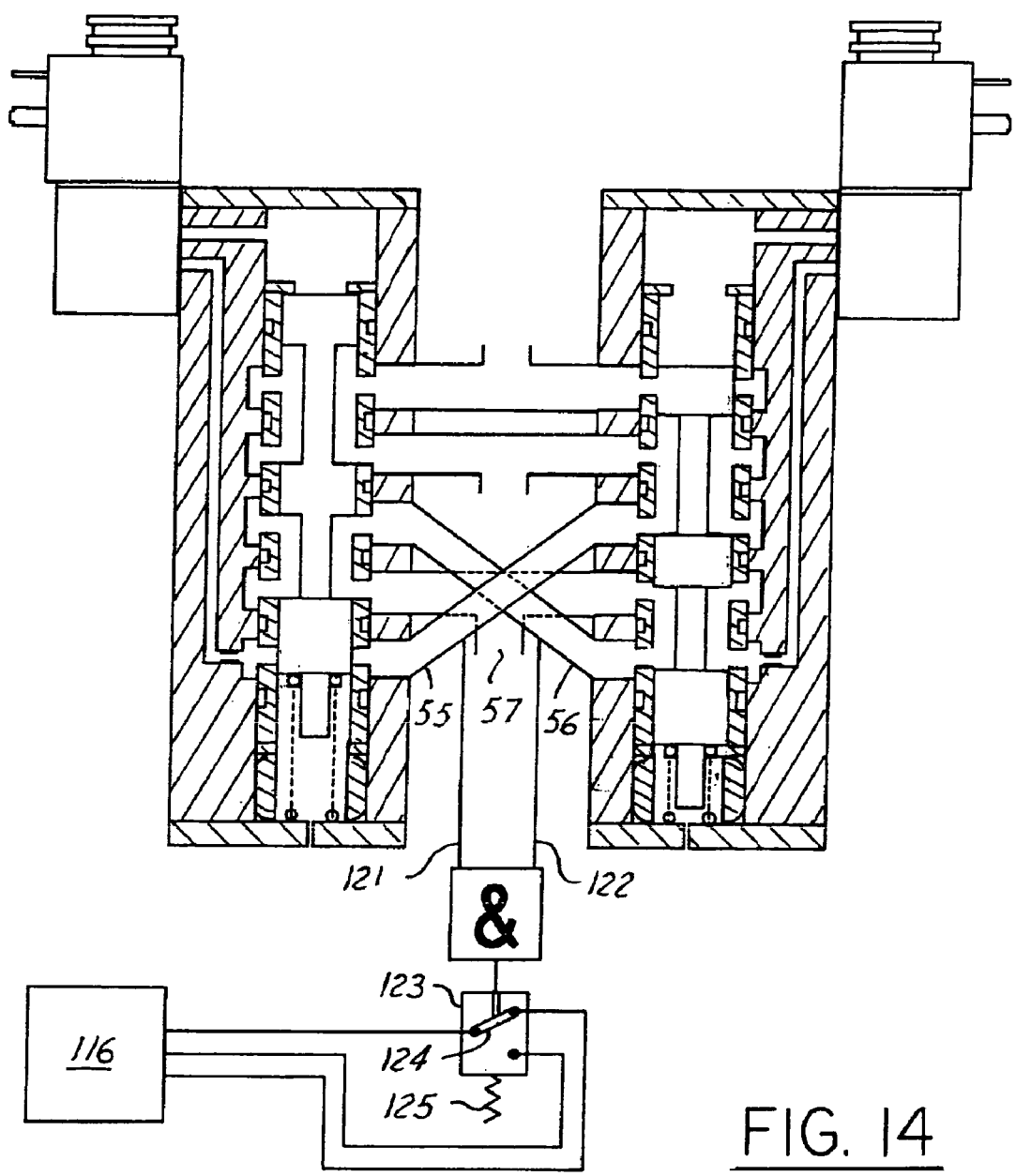
FIG. 14 is a side cross-sectional view of the double valve of FIG. 12 in a faulted position.

An alternative embodiment for monitoring the valve state is shown in FIGS. 12–14. An AND-gate 120 has a pair of inlets coupled by passages 121 and 122 to cross-connection passages 55 and 56, respectively. The outlet of AND-gate 120 is coupled to a pressure switch 123. There is pressure in the outlet of AND-gate 120 only when both inlets to AND-gate 120 are pressurized. Both inlets are pressurized whenever the double valve has not entered a faulted position. When the double valve is in a proper actuated or deactuated state, pressure from AND-gate 120 pushes a switch element 124 against spring 125, thereby actuating pressure switch 123 and supplying a corresponding signal to control monitor circuit 116. FIGS. 12 and 13 illustrate pressure switch 123 being actuated with the double valve in its deactuated and actuated positions, respectively.

FIG. 14 shows the double valve in a faulted state with first unitary valve assembly 11 in its deactuated position and second unitary valve assembly 12 in its actuated position. Cross-connection passage 55 is not pressurized while cross-connection passage 56 is pressurized. The unequal pressures supplied to AND-gate 120 causes the outlet of AND-gate 120 to become unpressurized. Pressure switch 123 is deactuated by spring 125 and a corresponding signal is provided to control monitor circuit 116.

Figure 15:
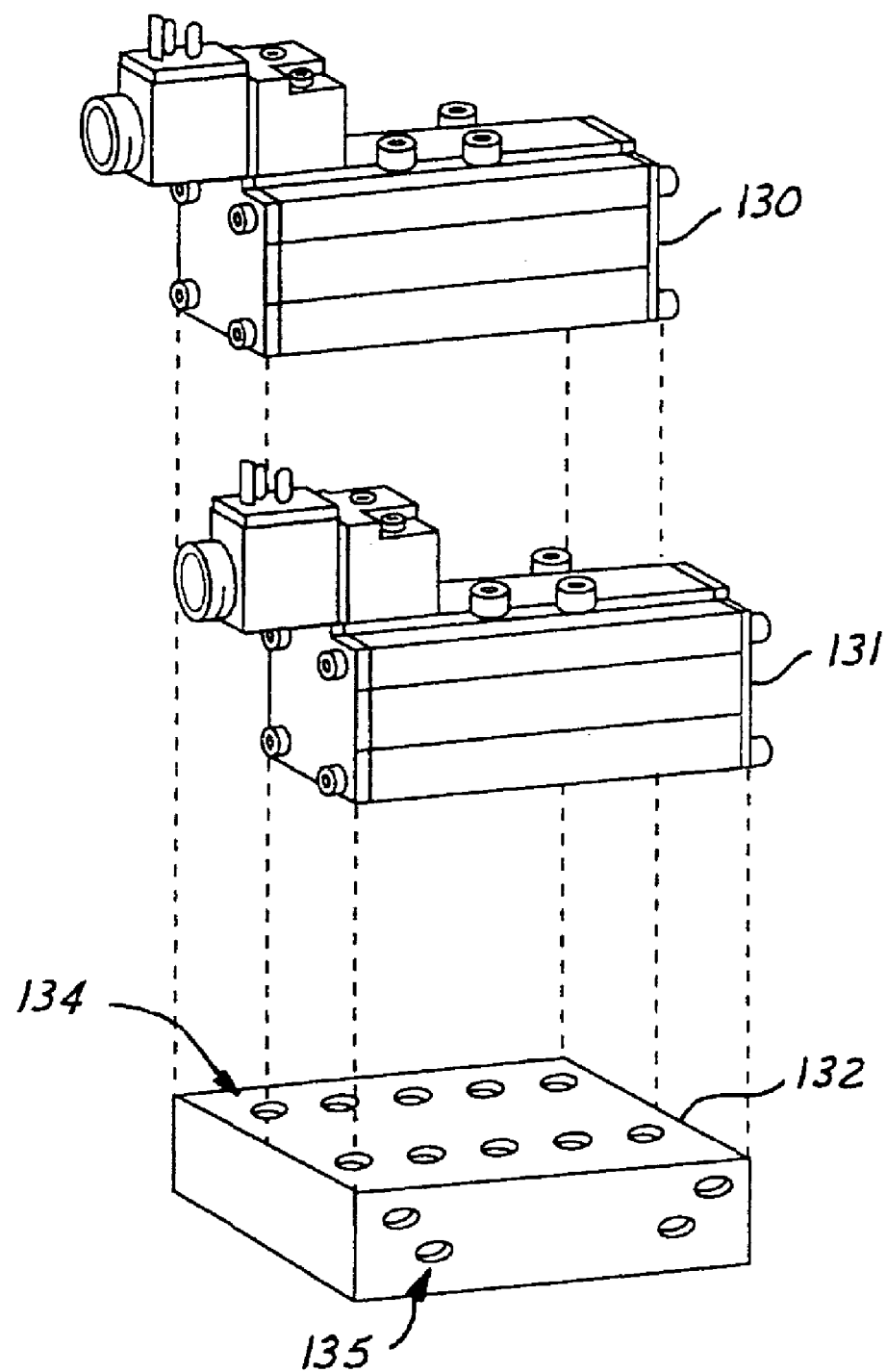
FIG. 15 is an exploded, perspective view of a double valve constructed from base-mounted unitary valve assemblies.

The valve construction shown in FIGS. 1 and 2 utilizes a standard in-line valve type. FIG. 15 shows an alternative embodiment utilizing base-mounted unitary valve assemblies 130 and 131. A plate 132 receives valve assemblies 130 and 131 and includes ports 134 on an upper surface thereof for interfacing with the ports of valve assemblies 130 and 131. Plate 132 includes ports 135 on an adjacent face to provide a corresponding inlet ports, outlet ports, exhaust ports, and sensing ports for the double valve of the present invention.

Although the present invention has been illustrated with in-line and base-mounted valves, other types of valves or combination of valves may be utilized in the present invention.

What is claimed is:

1. A double valve comprising:
    first and second unitary valve assemblies each having a respective inlet port, a respective outlet port, a respective exhaust port, a respective first cross-mirror port, and a respective second cross-mirror port;
    first and second pilot assemblies coupled to said first and second unitary valve assemblies, respectively;
    a first plate coupled to said first and second unitary valve assemblies including respective passages to provide a common inlet port coupled to said respective inlet ports of said first and second unitary valve assemblies and a common outlet port coupled to said respective outlet ports of said first and second unitary valve assemblies;
    a second plate coupled to said first and second unitary valve assemblies including respective passages to provide a first cross-connection between said first cross-mirror port of said first unitary valve body and said second cross-mirror port of said second unitary valve body, a second cross-connection between said second cross-mirror port of said first unitary valve body and said first cross-mirror port of said second unitary valve body, and a common exhaust port coupled to said respective exhaust ports of said first and second unitary valve assemblies.

2. The double valve of claim 1 wherein said second plate further provides first and second pressure monitoring passages coupled to said first and second cross-connections, respectively.

3. The double valve of claim 2 further comprising first and second pressure switches coupled to said first and second pressure monitoring passages, respectively.

4. The double valve of claim 3 further comprising first and second flow restrictors coupled between said first and second pressure switches and said first cross-connections of said first and second unitary valve assemblies, respectively.

5. The double valve of claim 2 further comprising:
    an AND-gate having input ports coupled to said first and second pressure monitoring passages, respectively, and having an output port which is pressurized when both of said input ports receive a pressure greater than or equal to a predetermined pressure; and a pressure switch coupled to said output port of said AND-gate for indicating whether said output port is pressurized.

6. The double valve of claim 1 further comprising:
first and second pilot passages supplying pressurized fluid from said first cross-mirror ports of said first and second unitary valve assemblies, respectively, to said first and second pilot assemblies, respectively.

7. The double valve of claim 6 wherein said first and second pilot passages are comprised of first and second tubing pieces, respectively, wherein said double valve further comprises first and second pilot plates coupling said first and second pilot assemblies with said first and second unitary valve assemblies, respectively, and wherein said first and second tubing pieces are coupled between said second plate and said first and second pilot plates.

8. The double valve of claim 1 wherein said first and second unitary valve assemblies are comprised of in-line valves.

9. A double valve comprising:
first and second unitary valve assemblies each having a respective inlet port, a respective outlet port, a respective exhaust port, a respective first cross-mirror port, and a respective second cross-mirror port, wherein said first and second unitary valve assemblies are comprised of base-mounted valves having bases conforming to standard dimensions;
first and second pilot assemblies coupled to said first and second unitary valve assemblies, respectively; and
a plate coupled to said first and second unitary valve assemblies including a plurality of ports on a face adjacent said first and second unitary valve assemblies interconnected by respective passages within said plate to provide a common inlet port coupled to said respective inlet ports of said first and second unitary valve assemblies, a common outlet port coupled to said respective outlet ports of said first and second unitary valve assemblies, a common exhaust port coupled to said respective exhaust ports of said first and second unitary valve assemblies, a first cross-connection between said first cross-mirror port of said first unitary valve body and said second cross-mirror port of said second unitary valve body, and a second cross-connection between said second cross-mirror port of said first unitary valve body and said first cross-mirror port of said second unitary valve body.

* * * * *